(12) United States Patent
Tang et al.

(10) Patent No.: US 9,712,030 B2
(45) Date of Patent: Jul. 18, 2017

(54) SHAFT ROTARY TYPE LINEAR MOTOR AND SHAFT ROTARY TYPE LINEAR MOTOR UNIT

(71) Applicant: SANYO DENKI CO., LTD., Tokyo (JP)

(72) Inventors: Yuqi Tang, Tokyo (JP); Satoshi Sugita, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 527 days.

(21) Appl. No.: 14/259,325

(22) Filed: Apr. 23, 2014

(65) Prior Publication Data
US 2014/0319934 A1 Oct. 30, 2014

(30) Foreign Application Priority Data

Apr. 25, 2013 (JP) .................. 2013-092961

(51) Int. Cl.
*H02K 41/02* (2006.01)
*H02K 5/12* (2006.01)
(Continued)

(52) U.S. Cl.
CPC ............... *H02K 41/02* (2013.01); *H02K 5/12* (2013.01); *H02K 9/00* (2013.01); *H02K 9/12* (2013.01);
(Continued)

(58) Field of Classification Search
CPC ........ H02K 41/00; H02K 41/02; H02K 41/03; H02K 41/031; H02K 41/0356;
(Continued)

(56) References Cited

U.S. PATENT DOCUMENTS 4,358,691 A * 11/1982 Naylor .................. H01F 7/1615
310/12.04
6,426,573 B1 7/2002 Hwang et al.
(Continued)

FOREIGN PATENT DOCUMENTS

CN 1976175 A 6/2007
CN 102223019 A 10/2011
(Continued)

OTHER PUBLICATIONS

Chinese Office Action issued on Feb. 14, 2016 for the corresponding Chinese Patent Application No. 201410167990.8.
(Continued)

*Primary Examiner* — Burton Mullins
*Assistant Examiner* — Alexander Singh
(74) *Attorney, Agent, or Firm* — Polsinelli PC

(57) ABSTRACT

The present invention provides a shaft rotary type linear motor that enables a movable element to rotate and linearly move by using a simple structure, and can therefore support compact, space-saving and lightweight designs. The shaft rotary type linear motor includes: a shaft; an outer cylinder; a hollow movable element having a plurality of permanent magnets within the outer cylinder; an armature surrounding the hollow movable element and having a plurality of coils; and a frame containing the armature. The shaft is supported by a rotatable and linearly movable linear guide.

16 Claims, 14 Drawing Sheets

(51) Int. Cl.
    *H02K 41/06*     (2006.01)
    *H02K 9/00*     (2006.01)
    *H02K 9/12*     (2006.01)
    *H02K 41/035*     (2006.01)
    *H02K 41/03*     (2006.01)

(52) U.S. Cl.
    CPC ....... *H02K 41/031* (2013.01); *H02K 41/0356* (2013.01); *H02K 41/06* (2013.01); *H02K 2201/18* (2013.01)

(58) Field of Classification Search
    CPC ........ H02K 41/06; H02K 41/065; H02K 5/00; H02K 5/12; H02K 5/128; H02K 5/1282; H02K 2201/18; H02K 9/00; H02K 9/005; H02K 9/02; H02K 9/08; H02K 9/10; H02K 9/12; H02K 9/14; H02K 9/16; H02K 9/18; H02K 9/19
    USPC ......... 310/12.01, 12.04, 12.05, 12.06, 12.07, 310/12.08, 12.09, 12.11, 12.12, 12.13, 310/12.14, 12.15, 89, 12.16, 12.17, 12.18, 310/12.19, 12.21, 12.23, 12.24, 12.25, 310/12.26, 12.27, 12.29, 12.31, 12.33
    See application file for complete search history.

(56) References Cited

U.S. PATENT DOCUMENTS

| | | | | |
|---|---|---|---|---|
| 6,952,060 | B2* | 10/2005 | Goldner | B60G 17/0157 310/12.13 |
| 7,667,355 | B2* | 2/2010 | Au | H02K 41/03 310/12.01 |
| 2011/0181129 | A1* | 7/2011 | Aso | H02K 7/083 310/12.14 |
| 2012/0001499 | A1* | 1/2012 | Makino | H02K 41/03 310/12.14 |
| 2012/0170016 | A1* | 7/2012 | Zordan | H02K 9/19 355/72 |
| 2012/0326533 | A1 | 12/2012 | Tang | |
| 2013/0127264 | A1 | 5/2013 | Fick et al. | |
| 2014/0159551 | A1 | 6/2014 | Aso et al. | |

FOREIGN PATENT DOCUMENTS

| | | |
|---|---|---|
| CN | 102780380 A | 11/2012 |
| CN | 102857067 A | 1/2013 |
| JP | S48-68706 U | 8/1973 |
| JP | H5-47541 U | 6/1993 |
| JP | 2001-105270 A | 4/2001 |
| JP | 3300465 B2 | 7/2002 |
| JP | 2007-142359 A | 6/2007 |
| JP | 2009-164398 A | 7/2009 |
| JP | 2010-057357 A | 3/2010 |
| JP | 2012-143143 A | 7/2012 |
| JP | 2012-147627 A | 8/2012 |
| JP | 2013-9564 A | 1/2013 |
| WO | WO 2010/038750 A1 | 4/2010 |

OTHER PUBLICATIONS

Office Action dated Aug. 30, 2016 from corresponding Japanese Patent Application No. 2013-092961, pp. 1-4.

* cited by examiner

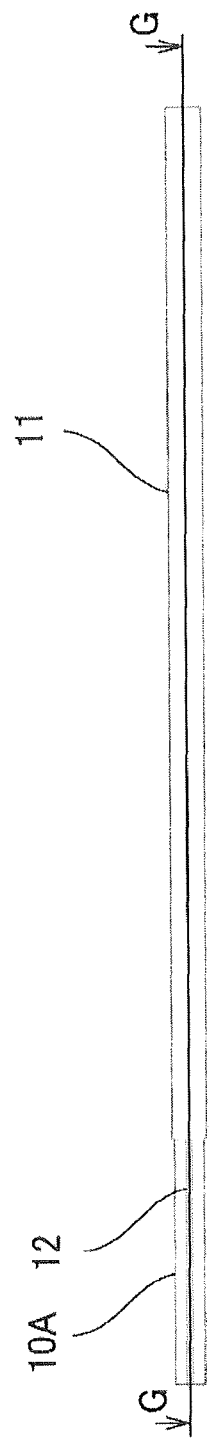

SHAFT ROTARY TYPE LINEAR MOTOR AND SHAFT ROTARY TYPE LINEAR MOTOR UNIT

CROSS-REFERENCE TO RELATED APPLICATION

This application claims priority to Japanese Application No. 2013-092961, filed Apr. 25, 2013, the entirety of which is incorporated herein by reference.

BACKGROUND

1. Technical Field

The present invention relates to a shaft rotary type linear motor and a shaft rotary type linear motor unit, which enable a driven object to rotate and linearly move.

2. Description of Related Art

Linear motors that operate by means of electromagnetic induction have compact bodies and can make fast movements, in comparison with mechanical actuators that operate, for example, with ball screw mechanisms. For example, many chip mounters (electronic component mounting devices) in semiconductor manufacturing apparatuses are equipped with rod-type linear motors. A rod-type linear motor includes a rod that has permanent magnets and coils that surround the rod. Further, it produces a thrust for the rod in its axial direction, on the basis of electromagnetic induction caused by a magnetic field created by the permanent magnets and current flowing through the coils, thereby linearly moving the rod.

Recently, a large number of techniques for improving a joint mechanism provided with a ball spline and a bearing, which couples a torque generator for a rotary motor to a thrust generator in a linear motor, have been proposed in order to cause linear motors to perform both rotational and linear moving operations.

One example of disclosed techniques associated with linear motors that can perform rotational and linear moving operations is an actuator with two degrees of freedom (see Japanese Patent No. 3300465). This actuator includes a rotary shaft that has a linear shaft and a spline groove in part of its circumference, and a spline guide bearing that engages with the spline groove.

Another example is a linear actuator that has a second shaft member disposed parallel to a rod of a linear motor (see Japanese Unexamined Patent Application Publication No. 2010-57357). In this linear actuator, the ends of the rod and the second shaft member are coupled to each other through a first joint member, so that the second shaft member linearly moves in relation to the linear movement of the rod. The second joint member couples the second shaft member to a housing in such a way that the second shaft member can linearly move but cannot rotate around the axis of the rod.

SUMMARY

Unfortunately, because of their complicated joint mechanisms, it is difficult for both techniques described above to support compact, space-saving and lightweight designs of linear motors.

Recently, a compact linear motor has been developed, in which: a central shaft that is linearly movable but not rotatable; and a rotary shaft is provided parallel to the central shaft so as to rotate in relation to the movement of the central shaft. However, this compact linear motor also requires a joint member that couples the central shaft to the rotary shaft, which could become a disadvantage in regard to compact, space-saving and lightweight designs of linear motors.

The present invention addresses the above disadvantage, and an object of the present invention is to provide a shaft rotary type linear motor and a shaft rotary type linear motor unit, which enable a movable element to rotate and linearly move by using a simple structure, and can therefore support compact, space-saving and lightweight designs.

Another object of the present invention is to provide a shaft rotary type linear motor and a shaft rotary type linear motor unit, which achieve a high performance at a low cost and have excellent heat dissipation.

According to an aspect of the present invention, a shaft rotary type linear motor includes a hollow movable element, an armature, and a frame.

The hollow movable element includes a shaft and an outer cylinder, and a plurality of permanent magnets are arranged within the outer cylinder. The armature surrounds the hollow movable element, and has a plurality of coils. The frame contains the armature. The shaft is supported by a rotatable and linearly movable linear guide.

In the shaft rotary type linear motor according to the aspect of the present invention, since the shaft that acts as a movable element is supported by the rotatable and linearly movable linear guide, it can rotate and linearly move. Consequently, the shaft rotary type linear motor can support compact, space-saving and lightweight designs by using a simple structure.

BRIEF DESCRIPTION OF THE DRAWINGS

FIGS. 15A and 15B are cross-sectional views showing airflow in the hollow movable element in the shaft rotary type linear motor according to the first embodiment.

DETAILED DESCRIPTION

Hereinafter, a description will be given of shaft rotary type linear motors according to first and second embodiments of the present invention and a shaft rotary type linear motor unit according to a third embodiment of the present invention, with reference to the accompanying drawings.

Shaft rotary type linear motors in the first and second embodiments and a shaft rotary type linear motor unit in the third embodiment each have a shaft supported by a rotatable and linearly movable linear guide.

According to the first to third embodiments, the shaft that acts as a movable element can rotate and linearly move. Consequently, the shaft rotary type linear motors and the shaft rotary type linear motor unit can support compact, space-saving and lightweight designs by using a simple structure.

First Embodiment

Configuration of Shaft Rotary Type Linear Motor

Figure 1:
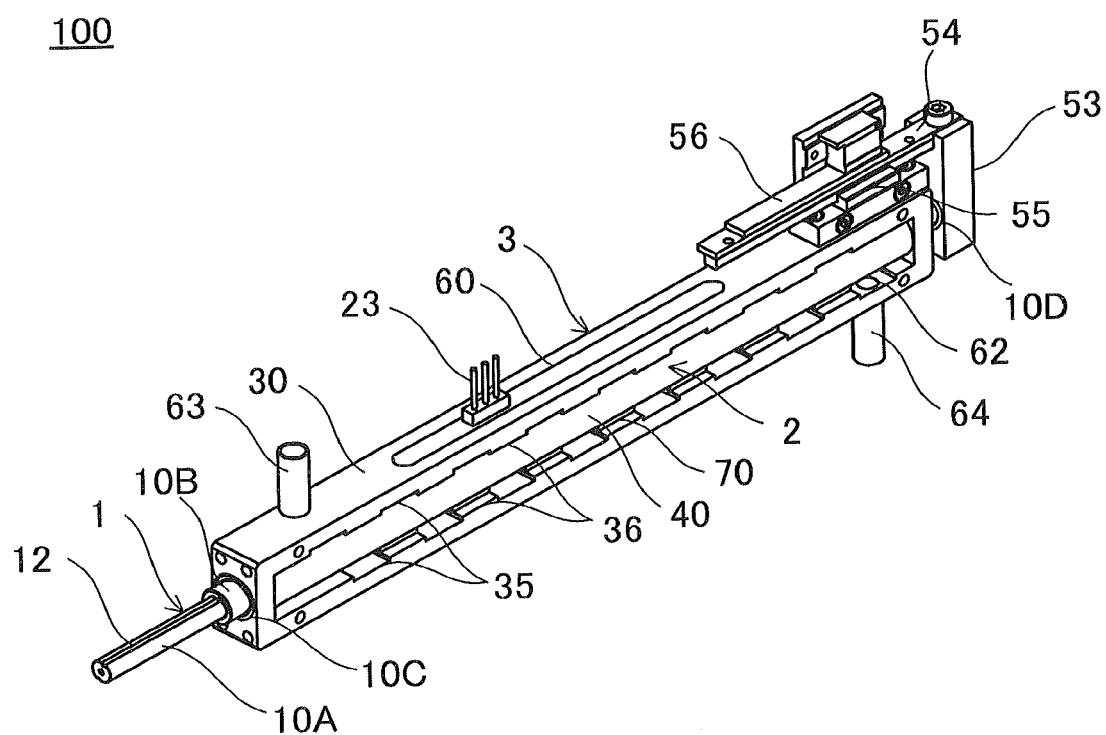
FIG. 1 shows a perspective view of a shaft rotary type linear motor according to a first embodiment of the present invention.
Figure 2:
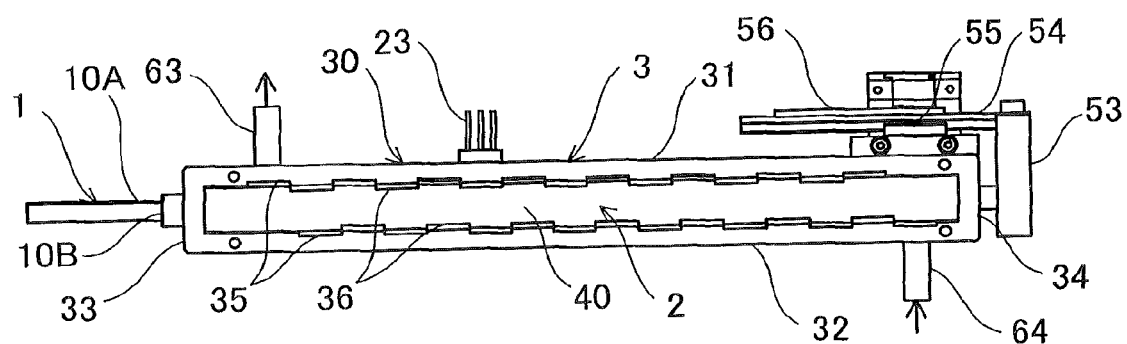
FIG. 2 shows the front of the shaft rotary type linear motor according to the first embodiment when the frame is opened.
Figure 3:
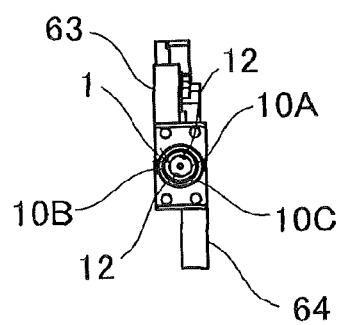
FIG. 3 shows the movable side of the shaft rotary type linear motor according to the first embodiment.
Figure 4:
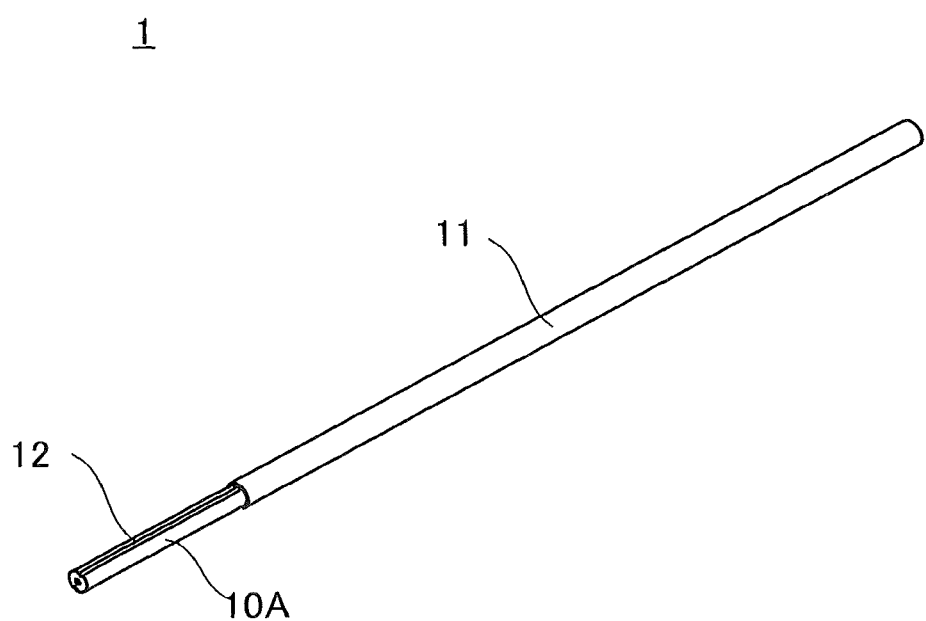
FIG. 4 shows a perspective view of the excitation section in the shaft rotary type linear motor according to the first embodiment.

First, a description will be given of a configuration of a shaft rotary type linear motor in the first embodiment, with reference to FIGS. 1 to 14. FIG. 1 shows a perspective view of a shaft rotary type linear motor in the first embodiment. FIG. 2 shows the front of the shaft rotary type linear motor in the first embodiment when the frame is opened. FIG. 3 shows the movable side of the shaft rotary type linear motor in the first embodiment. FIG. 4 shows a perspective view of the excitation section in the shaft rotary type linear motor in the first embodiment. Terms "tip" and "base end" used herein represent a left end and a right end, respectively, of the shaft rotary type linear motor shown in FIG. 1. In addition, a term "axial direction" represents a direction along which the shaft rotary type linear motor extends.

As shown in FIGS. 1 to 3, a shaft rotary type linear motor 100 in the first embodiment includes an excitation section 1, an armature 2 and a frame 3, as a movable element, a stator and a casing, respectively.

As shown in FIG. 4, the excitation section 1 is formed of a hollow movable element. The hollow movable element 1 has a shaft 10A and an outer cylinder 11.

Figure 5:
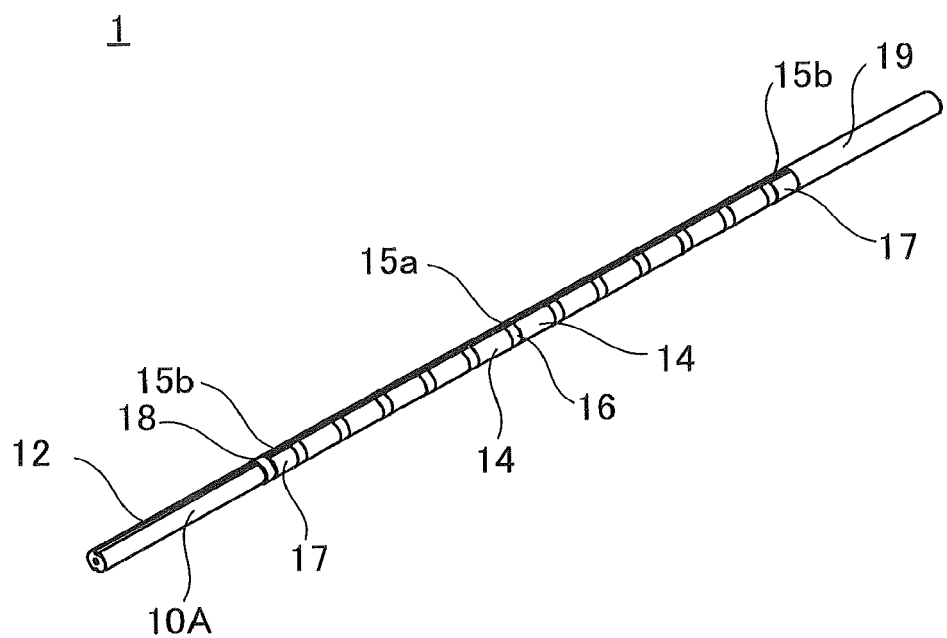
FIG. 5 shows a perspective view of the internal structure of the hollow movable element in the shaft rotary type linear motor according to the first embodiment.
Figure 6:
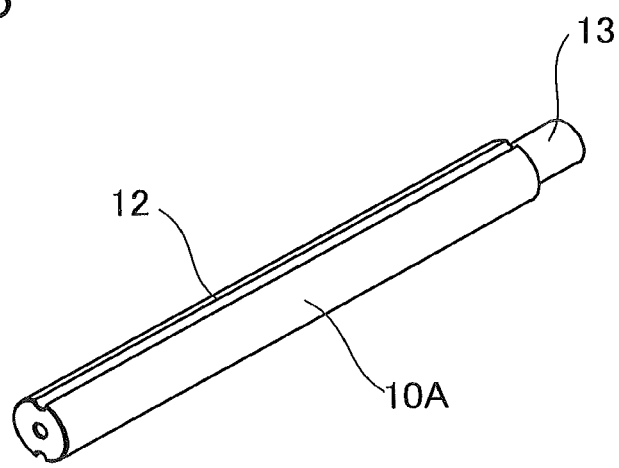
FIG. 6 shows a perspective view of the hollow spline shaft in the shaft rotary type linear motor according to the first embodiment.

FIG. 5 shows a perspective view of the internal structure of the hollow movable element in the shaft rotary type linear motor in the first embodiment. FIG. 6 shows a perspective view of the hollow spline shaft in the shaft rotary type linear motor in the first embodiment.

As shown in FIG. 5, the shaft 10A in the first embodiment is formed of a hollow spline shaft. As shown in FIGS. 3 and 6, the hollow spline shaft 10A is a short pipe member, and has two ball receiving grooves 12 and 12 at locations that oppose each other in its radial direction. Each ball receiving groove 12 extends linearly, and its vertical cross section has a circular shape in order to facilitate the rolling of a ball in a ball spline bushing 10B that will be described below. The hollow spline shaft 10 has a socket 13 formed on the base end side, and the socket 13 is inserted into a first hollow end member 18 that will be described below.

An air tube for supplying air is connectable to the hollow portion of the hollow spline shaft 10A. Examples of a mechanism for connecting the air tube include, but are not limited to, a tap, and a hole to which the air tube is to be connected.

Examples of a material of the hollow spline shaft 10A include, but are not limited to, an austenitic stainless steel and other non-magnetic metals.

Examples of a material of the outer cylinder 11 include, but are not limited to, an austenitic stainless steel and other non-magnetic metals.

Figure 7:
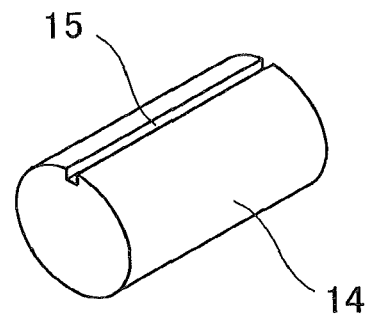
FIG. 7 shows a perspective view of a permanent magnet in the shaft rotary type linear motor according to the first embodiment.

FIG. 7 shows a perspective view of a permanent magnet in the shaft rotary type linear motor in the first embodiment.

As shown in FIGS. 5 and 7, permanent magnets 14 are arrayed within the outer cylinder 11 in the axial direction. Each permanent magnet 14 has a substantially cylindrical shape. In addition, a straight groove 15a having a rectangular cross section is formed in the circumferences of the permanent magnets 14 in their axial direction.

The permanent magnets 14 in this embodiment are arrayed such that identical magnetic poles oppose each other (e.g., N and N or S and S) In order to array the magnetic poles in this manner, a spacer 16, made of a soft magnetic material, is disposed between each adjacent pair of the permanent magnets 14. The spacer 16 has substantially the same shape as a permanent magnet 14, and is shorter than it in their axial direction.

Figure 8:
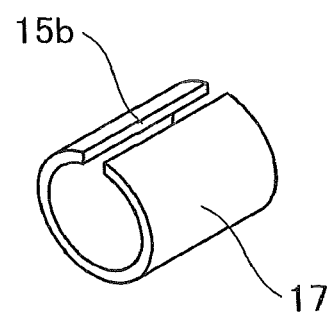
FIG. 8 shows a perspective view of a magnet presser in the shaft rotary type linear motor according to the first embodiment.

FIG. 8 shows a perspective view of a magnet presser in the shaft rotary type linear motor in the first embodiment.

As shown in FIGS. 5 and 8, magnet pressers 17 and 17, each of which is formed in a C shape, are provided at both ends of the array of the permanent magnets 14 with the spacers 16 therebetween. Each magnet presser 17 has a straight groove 15b. The magnet pressers 17 and 17 reduce the repulsion between the permanent magnets 14, by means of their spring forces, thereby increasing the efficiency of a process for arraying the permanent magnets 14. Each magnet presser 17 is made of, for example, a soft magnetic material such as a spring steel; however there is no limitation on the material of the magnet pressers 17 and 17.

Figure 9:
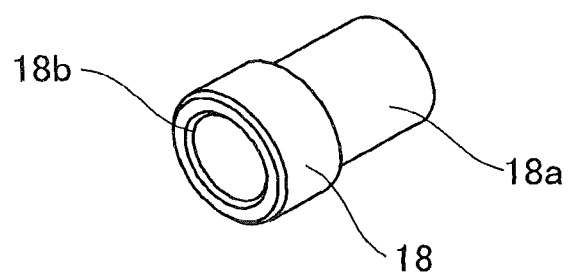
FIG. 9 shows a perspective view of the first hollow end member in the shaft rotary type linear motor according to the first embodiment.
Figure 10:
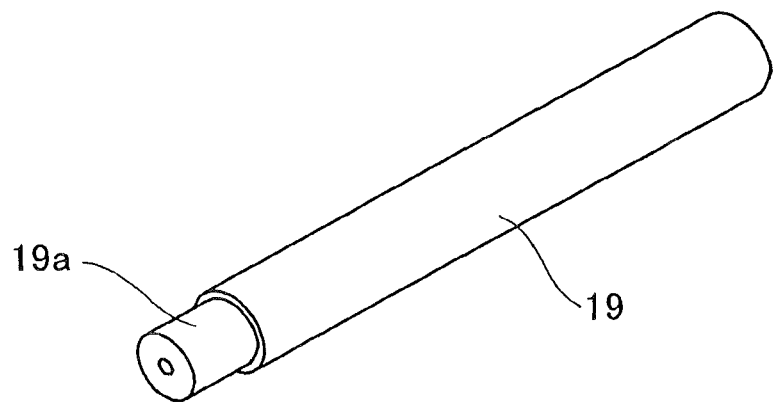
FIG. 10 shows a perspective view of the second hollow end member in the shaft rotary type linear motor according to the first embodiment.

FIG. 9 shows a perspective view of the first hollow end member in the shaft rotary type linear motor in the first embodiment. FIG. 10 shows a perspective view of the second hollow end member in the shaft rotary type linear motor in the first embodiment.

As shown in FIGS. 5, 9 and 10, the first hollow end member 18 and a second hollow end member 19 are provided at respective outer ends of the magnet pressers 17 and 17. More specifically, the first hollow end member 18 is disposed between the hollow spline shaft 10A and the magnet presser 17 located on the tip side.

As shown in FIG. 9, the first hollow end member 18 has a cylindrical shape with a step. A socket section 18a is formed on the base end side of the first hollow end member 18, and the socket section 18a is inserted into a corresponding one of the magnet pressers 17 and 17. The socket 13 of the hollow spline shaft 10A is inserted into a hollow part 18b of the first hollow end member 18.

As shown in FIG. 9, the second hollow end member 19 has a cylindrical shape with a step. A socket 19a is formed on the tip side of the second hollow end member 19, and the socket 19*a* is inserted into a corresponding one of the magnet pressers 17 and 17.

As shown in FIGS. 4 and 5, the outer cylinder 11 contains and covers the permanent magnets 14, the spacers 16, the magnet pressers 17 and 17, the first hollow end member 18 and the second hollow end member 19.

Figure 11:
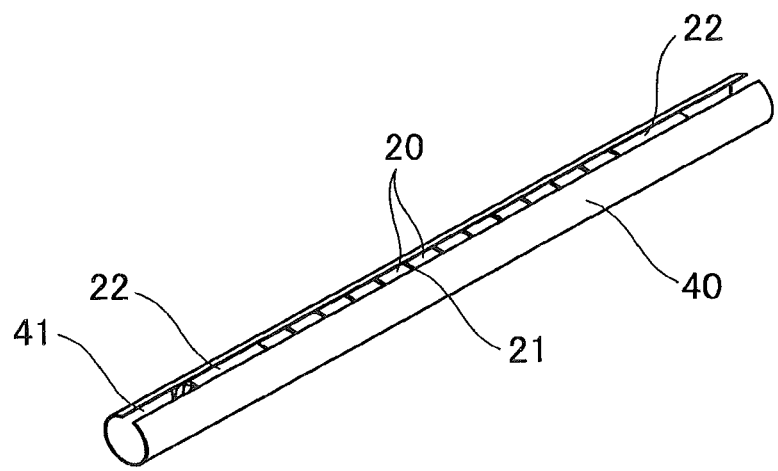
FIG. 11 shows a perspective view of the armature in the shaft rotary type linear motor according to the first embodiment.

FIG. 11 shows a perspective view of the armature in the shaft rotary type linear motor in the first embodiment.

As shown in FIGS. 1 to 3 and 11, the armature 2 has coils 20 and a magnetic barrel 40.

The circumference of the outer cylinder 11 in the hollow movable element 1 is covered by the arrayed coils 20 (see FIG. 4). As described above, the permanent magnets 14 arrayed such that identical magnetic poles oppose each other are contained in the outer cylinder 11 (see FIG. 5).

Each coil 20 is formed as a cylindrical, ring-shaped coil, and an insulating spacer 21 is disposed between each adjacent pair of the coils 20.

Cylindrical guide support barrels 22 and 22 are provided at both ends of the array of the coils 20. Each guide support barrel 22 contains a guide bushing (not shown) for the hollow movable element 1. The guide bushing may be contained in the frame 3 that will be described below.

The coils 20 are arrayed in the axial direction so as to sequentially correspond to the u, v and w phases of a three-phase AC power source, and the respective coils 20 corresponding to the u, v and w phases are connected to lead wires.

The magnetic barrel 40 is a cylindrical magnetic metal member provided with a straight opening 41 formed along the axial direction. The magnetic barrel 40 in this embodiment is formed in a cylindrical shape; however there is no limitation on the shape of the magnetic barrel 40, and alternatively it may have a rectangular shape or some other shape. The magnetic barrel 40 covers the circumferences of the coils 20. The coils 20 in the magnetic barrel 40 are supported by the guide support barrels 22 and 22.

The length of the magnetic barrel 40 is set to be greater than the total length of the permanent magnets 14 in the hollow movable element 1 which are to be disposed in the coils 20. In more detail, the length of the magnetic barrel 40 is equal to or greater than the sum of twice the stroke length of the hollow movable element 1 and the total length of the permanent magnets 14.

The magnetic barrel 40 closes a large part of the permanent magnets 14 in the hollow movable element 1, thereby fulfilling a function of reducing the leakage flux from the permanent magnets 14. The straight opening 41 in the magnetic barrel 40 defines a space through which the lead wires of the coils 20 pass, and functions as a cooling passage.

The magnetic barrel 40 in the first embodiment has a substantially cylindrical shape. The straight opening 41 in this embodiment is formed as a slit formed in the upper portion of the magnetic barrel 40 along the axial direction. The straight opening 41 is formed in only the upper portion of the magnetic barrel 40; however it may also be formed in the lower portion of the magnetic barrel 40.

The magnetic barrel 40 is made of, for example, an iron-based magnetic material, such as a carbon steel for machine structural use. It is preferable that the magnetic barrel 40 be made of a silicon steel manufactured by sheet metal processing or press molding, from the viewpoint of both cost and performance; however there is no limitation on the material of the magnetic barrel 40.

Figure 12:
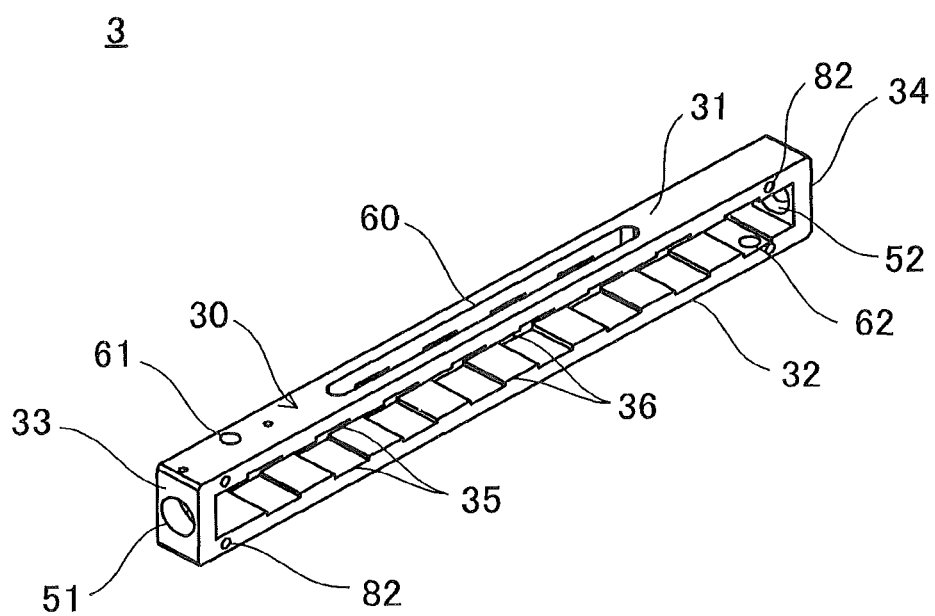
FIG. 12 shows a perspective view of the frame in the shaft rotary type linear motor according to the first embodiment.
Figure 13:
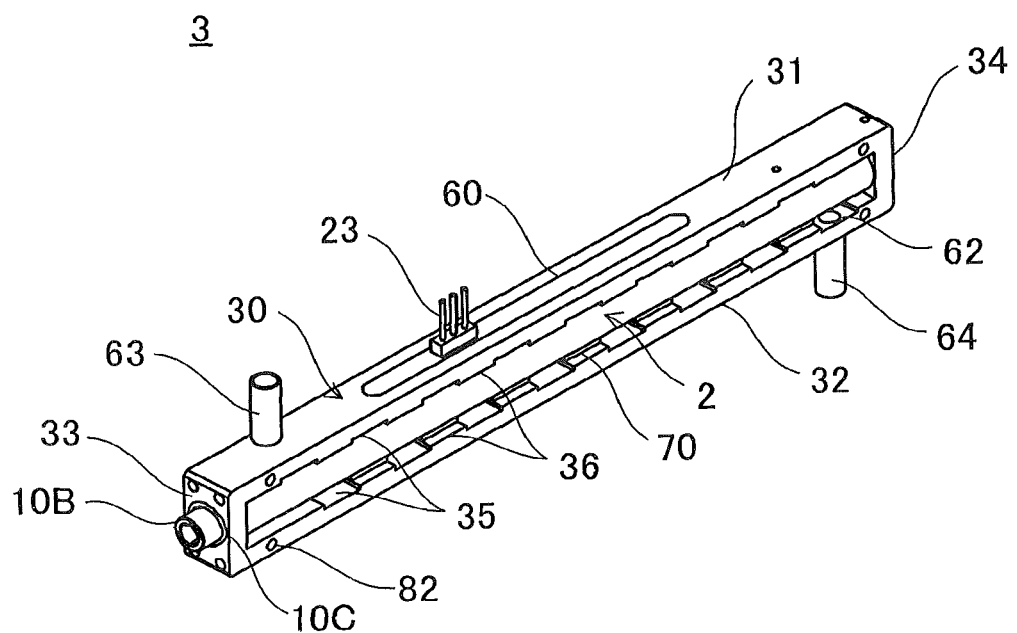
FIG. 13 shows a perspective view of the frame and armature in the shaft rotary type linear motor according to the first embodiment.

FIG. 12 shows a perspective view of the frame in the shaft rotary type linear motor in the first embodiment. FIG. 13 shows a perspective view of the frame and armature in the shaft rotary type linear motor in the first embodiment.

As shown in FIGS. 1 to 3 and 12, the frame 3 is a rectangular-frame-shaped member that contains the excitation section 1 and the armature 2. The frame 3 covers the upper and lower portions of the armature 2 in the radial direction and both ends of the armature 2 in the axial direction. A frame main body 30 in the frame 3 which acts as a rectangular frame includes an upper frame 31, a lower frame 32, and end frames 33 and 34 located in its longitudinal direction (i.e., the axial direction). The frame main body 30 is open in both end surfaces along the width direction.

It is preferable that the constituent material of the frame 3 be aluminum or an aluminum alloy from the viewpoint of the ease of processing; however there is no limitation on the material of the frame 3. The frame 3 can easily be molded through plastic processing such as extrusion processing.

The end frames 33 and 34, which are provided at both ends of the frame main body 30 in the longitudinal direction (i.e., the axial direction), have through-holes 51 and 52, respectively. The hollow movable element 1 passes through the through-holes 51 and 52.

As shown in FIGS. 3 and 13, a rotatable bearing 10C is attached to the through-hole 51 in the end frame 33. The ball spline bushing 10B is supported by the rotatable bearing 10C. The ball spline bushing 10B guides the linear movement of the hollow spline shaft 10A in the hollow movable element 1 by using a ball (not shown) installed therein, thereby configuring a ball spline mechanism. The ball spline bushing 10B and the rotatable bearing 10C are integrated with each other.

As shown in FIGS. 1, 2, 12 and 13, the base end part of the hollow movable element 1 is supported by a rotatable bearing 10D fixed to a block member 53 formed in a square pole shape. The block member 53 is disposed along a base end frame 34. The upper end of the block member 53 is connected to an extending member 54 provided along the upper frame 31 of the frame main body 30.

The extending member 54 is folded toward the frame 3 and supported by the block member 53. The extending member is slidably disposed on a guide block 55 having a substantially C-shaped cross section. A linear encoder 56 is provided on the extending member 54. The linear encoder 56 detects the location of the movable element 1, and outputs information regarding the detected location.

It is preferable for the linear encoder 56 to be disposed at a location away from the armature 2 containing the coils 20, in order to reduce the influence of magnetism and heat. The linear encoder 56 may employ any given type of system such as a magnetic or optical type of system. It is preferable that the movable part of the linear encoder 56 be disposed at a site on or close to the linear guide, more specifically, on or close to an LM guide or ball spline, in order to ensure stable driving and high performance.

The upper frame 31 of the frame main body 30 is provided with a long through-hole 60. The long through-hole 60 defines a space through which the lead wires are connected to the coils 20, and functions as a space through which a connection terminal 23 passes. The long through-hole 60 also functions a cooling air passage.

Each of the inner surfaces of the upper frame 31 and the lower frame 32 in the frame main body 30 has recesses 35 and projections 36 formed alternately therein along the axial direction; the recesses 35 and the projections 36 are configured to create a cooling passage and fix the magnetic barrel 40, respectively. Because of their uneven inner surfaces, the upper frame 31 and the lower frame 32 partially make contact with the magnetic barrel 40. The magnetic barrel 40 is fixed to the contact portions of the projections 36 with a filler 70 such as an adhesive or molding material, and the armature 2 containing the coils 20 is cooled by means of heat transfer in the contact portions. The recesses 35 that are not in contact with the magnetic barrel 40 serve as the cooling passage. The recesses 35 in the upper frame 31 and the recesses 35 in the lower frame 35 are slightly shifted from each other in the axial direction so as to at least overlap each other, thus configuring a substantially spiral-shaped cooling passage between the magnetic barrel 40 and the frame 3.

The upper frame 31 and the lower frame 32 in the frame main body 30 are provided with taps (through-holes) 61 and 62 as an outlet and inlet, via which cooling air flows in the substantially spiral-shaped cooling passage. The taps 61 and 62 in the upper frame 31 and the lower frame 32, respectively, are shifted from the center of their bodies and positioned at substantially opposing corners. The tap 61 communicates with the interior of a short pipe 63; the tap 62 communicates with the interior of a short pipe 64. In this embodiment, the short pipe 64 in the lower frame 32 serves as the inlet for the cooling air, and the short pipe 63 in the upper frame 31 serves as the outlet for the cooling air; however the arrangement of the inlet and outlet may be reverted.

Figure 14:
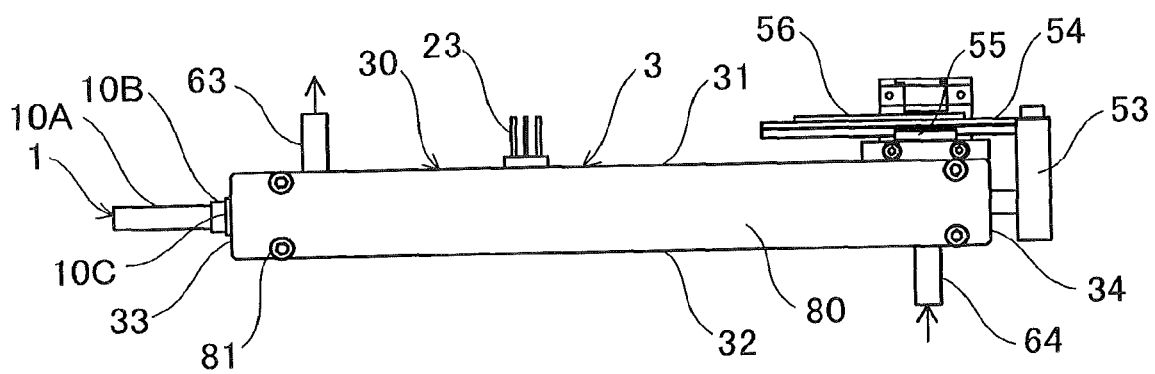
FIG. 14 shows the front of the shaft rotary type linear motor according to the first embodiment.

FIG. 14 shows the front of the shaft rotary type linear motor in the first embodiment.

As shown in FIGS. 1 and 2 and 12 to 14, screw through-holes 82 and 82 are formed at both ends of each of the upper frame 31 and the lower frame 32, and bolts 81 pass through and are fastened to the corresponding screw through-holes 82. In the case where the shaft rotary type linear motor 100 in this embodiment is implemented using a single-axis or multi-axis actuator unit, the bolts 81 are fastened to the corresponding screw through-holes 82 with sealing plates 80 and 80 therebetween, so that the openings in both end surfaces of the frame main body 30 in the width direction are closed.

(Operation of Shaft Rotary Type Linear Motor)

Next, a description will be given of an operation of the shaft rotary type linear motor 100 in the first embodiment, with reference to FIGS. 1 to 15.

As shown in FIGS. 1 to 4, in the excitation section (hollow movable element) 1 of the shaft rotary type linear motor 100 in the first embodiment, the permanent magnets 14 are arrayed within the outer cylinder 11 such that identical magnetic poles oppose one another in the axial direction (e.g., N and N or S and S). The armature 2 is provided so as to surround the hollow movable element 1 having the permanent magnets 14, and the coils 20 are arrayed within the armature 2 in the axial direction. The arrayed coils 20 sequentially corresponds to the u, v and w phases of the three-phase AC power source, and the three-phase AC power source feeds currents through the coils 20 for the u, v and w phases while shifting their phases.

The armature 2 functions as a stator, and the hollow movable element 1 linearly moves within the armature 2. More specifically, in the shaft rotary type linear motor 100 in this embodiment, currents flow through the coils 20 in the armature 2 so as to cross the magnetic flux generated by the permanent magnets 14 in the hollow movable element 1. When the magnetic flux generated by the permanent magnets 14 crosses the currents flowing through the coils 20 in the armature 2, the shaft rotary type linear motor 100 in this embodiment exerts a thrust, produced by means of the electromagnetic induction, on the permanent magnets 14 in the axial direction, thereby linearly moving the hollow movable element 1.

As shown in FIGS. 1 to 6, the balls of the ball spline bushing 10B roll along the ball receiving grooves 12 and 12 of the hollow spline shaft 10A in the hollow movable element 1. The hollow spline shaft 10A thereby moves linearly and swiftly.

The ball spline bushing 10B is supported by the rotatable bearing 10C fixed to the end frame 33 of the frame 3. Therefore, by driving the ball spline bushing 103 with a belt connected to a rotary motor (not shown), the hollow spline shaft 10A can be rotated together with the ball spline bushing 10B.

Since only the hollow movable element 1 is movable, either of optical and magnetic types of linear sensor can be used Although the hollow movable element 1 can rotate and linearly moves, other components required for this linear movement is suppressed from rotating.

Improving the arrangement of both the ball spline bushing 10B and the rotatable bearing 10C enables the hollow movable element 1 to rotate and linearly move, thus contributing to compact and space-saving designs of linear motors.

The hollow movable element 1 is supported by a rotatable and linearly movable mechanism, but a ball spline mechanism may be used depending on some applications, instead of the above mechanism. In this case, it is possible to improve the quality of the driver and to extend the lifetime thereof.

A rotary motor that rotates the hollow spline shaft 10A can be attached and installed arbitrarily. This increases the flexibility of system designs and configurations.

As shown in FIGS. 11 to 13, in the shaft rotary type linear motor 100 in the first embodiment, the coils 20 for the u, v and w phases are arrayed within the magnetic barrel 40 that has the straight opening (slit) 41 formed along the axial direction. The lead wires of the coils 20 for the u, v and w phases are placed within the frame 3 while being routed from the interior of the magnetic barrel 40 to the exterior thereof through the straight opening (slit) 41.

The magnetic barrel 40 encloses the magnetic flux generated by the permanent magnets 14 in the hollow movable element 1, reducing the leakage flux. Even if a plurality of linear motors 100 in this embodiment are arranged parallel to one another as will be described below, the magnetic interference between the shaft rotary type linear motors can be reduced.

The frame main body 30 has a rectangular frame body, and its components are the upper frame 31, the lower frame 32, and the end frames 33 and 34 located in the longitudinal direction. The upper frame 31 is provided with the long through-hole 60, which defines a space through which the lead wires are connected to the coils 20 for the u, v and w phases. The lead wire connecting terminal 23 is exposed from the long through-hole 60.

The magnetic barrel 40 is fixed with the filler 70 to the contact surfaces of the projections 36 formed on the inner surface of the lower frame 32. Therefore, the armature 2 containing the coils 20 is cooled by means of the heat transfer in the contact surfaces.

Figure 15B:
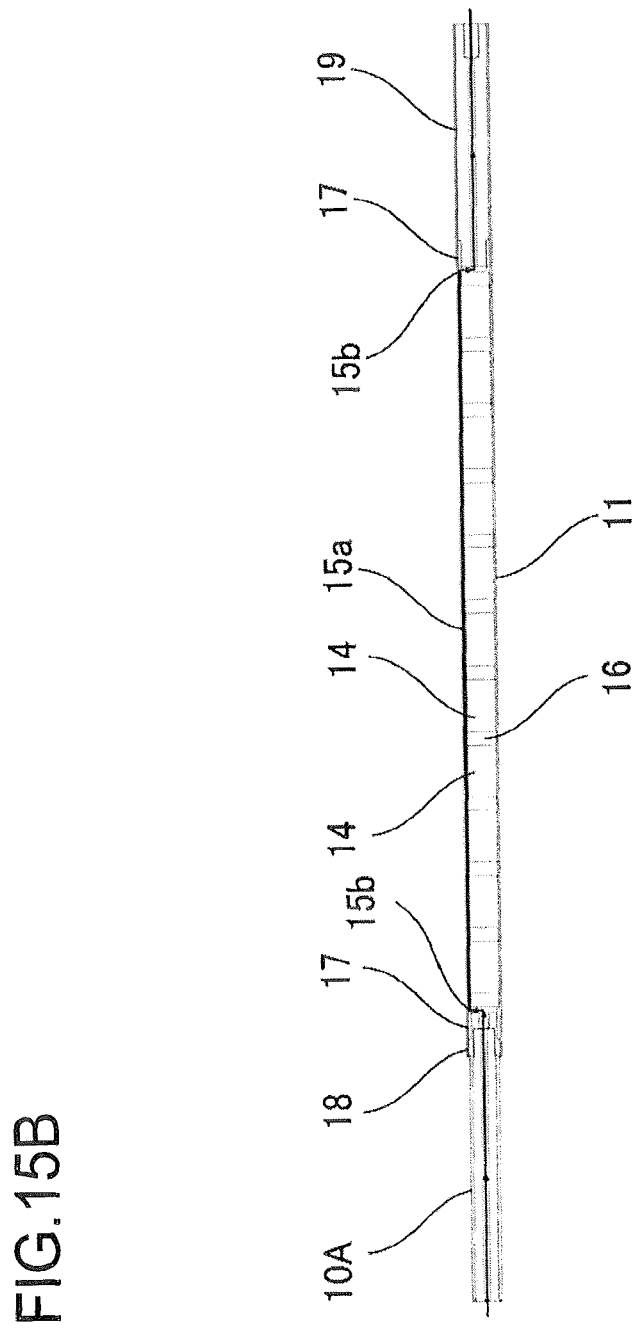

Next, a description will be given of airflow that is created within the shaft rotary type linear motor 100 in the first embodiment. FIGS. 15A and 15B are cross sections showing airflow within the hollow movable element in the shaft rotary type linear motor according to the first embodiment. FIG. 15B shows a cross section taken along a line G-G in FIG. 15A.

As shown in FIGS. 4 to 10, the outer cylinder 11 in the hollow movable element 1 contains and covers the first hollow end member 18, the magnet presser 17, the spacers 16, the permanent magnets 14, the magnet presser 17, and the second hollow end member 19 which are all arranged in this order.

In FIG. 15B, the arrow indicates airflow created when an air tube is connected to the hollow portion of the hollow spline shaft 10A.

As shown in FIGS. 15A and 15B, when air from the air tube (not shown) is introduced to the hollow portion of the hollow spline shaft 10A, it passes through the first hollow end member 18, and then flows into the magnet presser 17 located on the tip side. Since the magnet presser 17 has a C-shape, the air passes through the straight groove 15b of the magnet presser 17, and then flows along the inner surface of the outer cylinder 11.

After the air has flown along the inner surface of the outer cylinder 11, it passes through the straight groove 15a in the spacers 16 and the permanent magnets 14. After the air has passed through the straight groove 15a in the spacer 16 and the permanent magnet 14, it flows into the magnet presser 17 located on the base end side through the straight groove 15b thereof. After the air has flown into the magnet presser 17 located on the base end side, it passes through the hollow portion of the second hollow end member 19, and finally flows out of the second hollow end member 19.

By providing the straight groove 15a in the outer circumferences of the solid-core permanent magnets 14 along the axial direction, high-grade magnets can be used. This enables the function of the hollow spline shaft 10A to be implemented at a low cost. Furthermore, it is possible to increase thrusts produced in linear motors, and to improve performances thereof. On the other hand, in the case where hollow magnets are applied to linear motors, their performances and functions are disadvantageously lowered due to the decreased magnetic flux density and poor rust prevention quality of the hollow magnets. This is because hollow magnets cannot employ any magnets other than magnets manufactured through a parallel magnetic field press.

As shown in FIGS. 1, 2, 12 and 13, the recesses 35 and the projections 36 are alternately formed in the inner surface of each of the upper frame 31 and the lower frame 32 in the frame main body 30. The recesses 35 of the upper frame 31 and the lower frame 32 configure a spiral-shaped cooling passage between the magnetic barrel 40 and the frame 3.

The upper frame 31 and the lower frame 32 in the frame main body 30 are provided with the taps 61 and 62, respectively, which cause cooling air to pass through the cooling passage, and the taps 61 and 62 communicate with the short pipes 63 and 64, respectively. The cooling air enters the short pipe 64 and is output from the short pipe 63, thereby creating airflow in the interior of the frame 3. The cooling air passes through the gap between the recesses 35 and the magnetic barrels 40, and creates turbulence in the frame main body 30 while cycling. This can cool the armature 2 containing the coils 20 efficiently.

In the shaft rotary type linear motor 100 in the first embodiment, the armature 2 surrounds the hollow movable element 1 having the permanent magnets 14. The magnetic barrel 40 in the armature 2 which has the straight opening 41 contains the coils 20.

Since the magnetic barrel 40 has a cylindrical body made of a magnetic material, it can be manufactured easily, for example, by subjecting a silicon steel to sheet metal or press processing. The frame 3 can also be manufactured easily, for example, extrusion processing. The shaft rotary type linear motor 100 in this embodiment thus achieves a high performance at a low cost.

The magnetic barrel 40 closes a large part of the permanent magnets 14, thereby reducing the leakage flux. This can make an additional magnetic shield plate unnecessary, and support compact, space-saving and lightweight designs.

The hollow movable element 1 having the permanent magnets 14 is surrounded by the ring-shaped coils 20, and the coils 20 are contained in the magnetic barrel 40 having the straight opening 41. Therefore, in the linear motor 100 in the first embodiment, the magnetic barrel 40 closes a large part of the permanent magnets 14, reducing the leakage flux.

The lead wires for the coils 20 can be routed through the long through-hole 60 in the upper frame 31 and the straight opening 41, so that a space where the lead wires are connected to the coils 20 can be reserved.

The straight opening 41 is provided in the magnetic barrel 40, and a gap that is created between the recesses 35 of the upper frame 31 and the lower frame 32 and the outer circumference of the magnetic barrel 40 functions as a cooling passage. When the right and left openings of the frame main body 30 is closed by the sealing plates 80 and 80, the cooling passage forms a substantially spiral shape. By blowing cooling air into the substantially spiral-shaped cooling passage, the armature 2 containing the coils 20 can be cooled. Consequently, the shaft rotary type linear motor 100 in this embodiment dissipates heat excellently.

Because of the linear encoder 56, the shaft rotary type linear motor 100 in this embodiment can be used as a single-axis actuator. In addition, by combining a plurality of linear motors 100 in this embodiment, multi-axis actuator can be configured. Both the hollow movable element 1 and the linear encoder 56 linearly move, but the rotation of the hollow movable element 1 does not interfere with the linear movement of the linear encoder 56. The linear encoder 56 accordingly may employ any given one of various types of linear encoders, including optical and magnetic types of linear encoders.

In the case where the shaft rotary type linear motor 100 is applied to a chip mounter, its head assembly can be configured flexibly, because the shaft rotary type linear motor 100 in this embodiment can configure both single-axis and multi-axis actuators easily.

The shaft rotary type linear motor 100 in this embodiment is suitable for an application in which rotational and linear moving operations are performed in a limited space. In particular, the shaft rotary type linear motor 100 is suitably applicable to semiconductor manufacturing apparatuses in which a possibly large number of linear motors, such as chip mounters, are arranged parallel to one another within a limited space, and semiconductor chips are positioned preciously by means of air sucking force while rotational and linear moving operations are performed at the same time. Moreover, the novel magnet arrangement and simple rotation and linear movement mechanism which are incorporated in the shaft rotary type linear motor 100 make it possible to increase thrusts produced by linear motors, and to reduce in size, simplify designs, and decrease a cost of linear motors.

Second Embodiment

Figure 16:
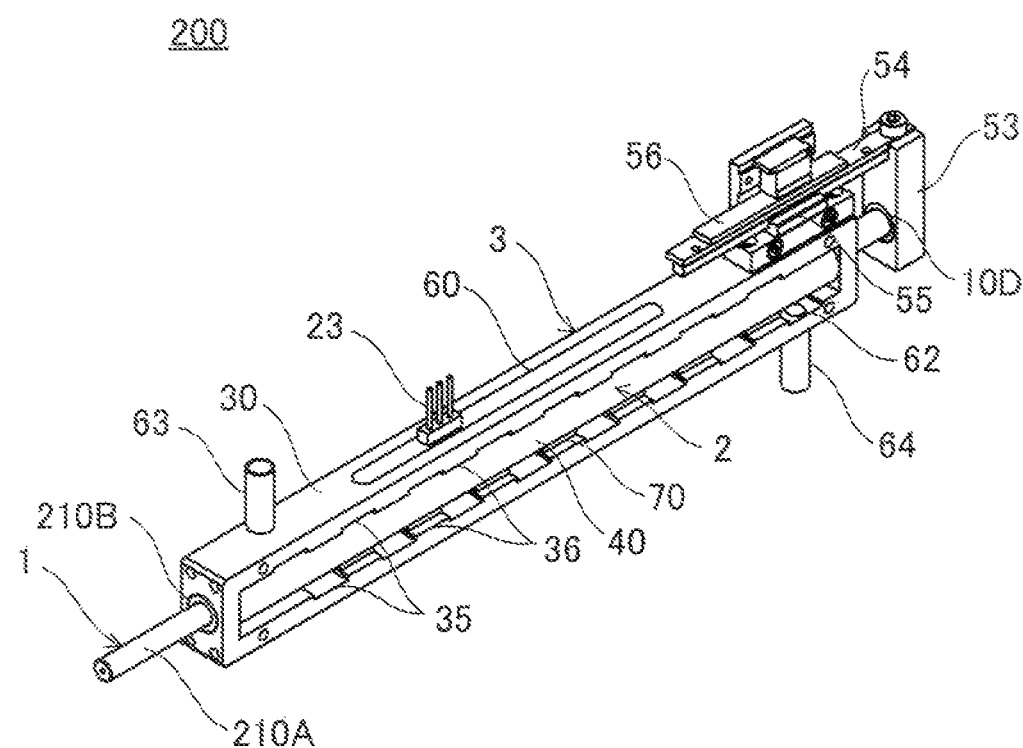
FIG. 16 shows a perspective view of a shaft rotary type linear motor according to a second embodiment of the present invention.

Next, a description will be given of a shaft rotary type linear motor 200 according to a second embodiment of the present invention, with reference to FIG. 16. FIG. 16 shows a perspective view of the shaft rotary type linear motor in the second embodiment. Constituent elements that are the same as in the shaft rotary type linear motor 100 in the first embodiment are denoted by the same reference characters and will not be described.

As shown in FIG. 16, the linear motor 200 in the second embodiment has the same configuration as the linear motor 100 in the first embodiment, except for a shaft 210A and a linear guide 210B.

In the shaft rotary type linear motor 200 in the second embodiment, the shaft 210A is formed of a hollow shaft with no groove, and is supported by a rotatable and linearly movable linear guide 210B.

The rotatable and linearly movable linear guide 210B is formed of, for example, a linear bushing (metal bushing) or a sliding bearing; however there is no limitation on the configuration of the movable linear guide 210B, and it may be formed of any given rotatable and linearly movable member.

When a hollow movable element 1 linearly moves by means of electromagnetic induction caused by the permanent magnets 14 in the hollow movable element 1 and coils 20 in an armature 2, it is guided by both the linear guide 210B disposed on the tip side and a rotatable bearing 10D disposed on the base end side.

The hollow movable element 1 rotates by being driven by a belt connected to a rotary motor (not shown).

The shaft rotary type linear motor 200 in the second embodiment produces the same effect as the shaft rotary type linear motor 100 in the first embodiment. In particular, the shaft rotary type linear motor 200 is highly effective in a cost reduction, because the shaft 210A and the linear guide 210B are configured simply.

Third Embodiment

Figure 17:
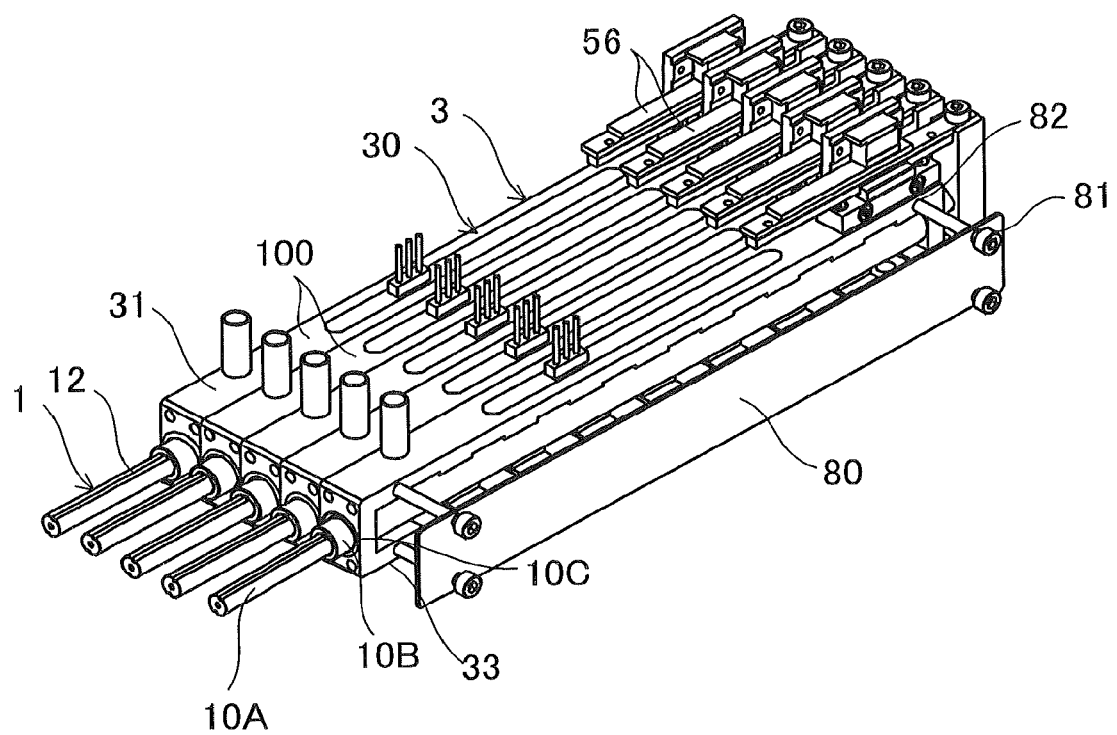
FIG. 17 shows a perspective view of a shaft rotary type linear motor unit according to a third embodiment of the present invention.

Next, a description will be given of a shaft rotary type linear motor unit 300 according to a third embodiment of the present invention, with reference to FIG. 17. FIG. 17 shows a perspective view of the shaft rotary type linear motor unit in the third embodiment. Constituent elements that are the same as in the shaft rotary type linear motor 100 in the first embodiment are denoted by the same reference characters and will not be described.

As shown in FIG. 17, in the linear motor unit 300 in the third embodiment, a plurality of linear motors 100 in the first embodiment are combined as a single unit while being arranged in their width (lateral) direction.

In the linear motor unit 300, each of the upper frame 31 and the lower frame 32 has screw through-holes 82 and 82 formed at both ends, to which long bolts 81 and 81 are to be fastened. The shaft rotary type linear motors 100 are arranged in their width direction while abutting against one another, and sealing plates 80 and 80 are attached to both sides of the arrangement of the linear motors 100. Then, by passing the long bolts 81 through the sealing plates 80 and 80 and the corresponding screw through-holes 82 in the shaft rotary type linear motors 100, the shaft rotary type linear motor 100 are combined as a multi-axis linear motor unit. As a result, the openings formed on both sides of the shaft rotary type linear motor unit 300 in this embodiment are closed.

The width of each frame 3 conforms to the specification of a tape feeder, but the outer diameter or width of each magnetic barrel 40 is set to be smaller than that of each frame main body 30 (see FIG. 11). Accordingly, when the shaft rotary type linear motors 100 are arranged in their width direction as a multi-axial linear motor, it is only necessary to set the shaft rotary type linear motors 100 so as to bring the side surfaces of the frames 3 into contact with one another. In this manner, the shaft rotary type linear motor unit (head module) 300 is assembled easily and accurately.

When the shaft rotary type linear motors 100 are arranged in the above manner, both sides of the shaft rotary type linear motor 100 are closed. Therefore, the leakage of cooling air for the linear motors 100 is reduced, and its airflow is kept naturally, so that the cooling effect of the shaft rotary type linear motor unit 300 in this embodiment is enhanced.

When the shaft rotary type linear motors 100 abut against one another, a gap is created between each adjacent pair of the magnetic barrels 40. With this gap, the cooling effect is increased and the magnetic interference is decreased between the adjacent magnetic barrels 40.

Since linear encoders 56 are provided individually in the shaft rotary type linear motors 100, they can assess the locations of the corresponding linear motors 100 independently of one another.

The third embodiment has been described regarding the case where a plurality of shaft rotary type linear motor 100 in the first embodiment are used. However, even by using a plurality of shaft rotary type linear motors 200 in the second embodiment, the shaft rotary type linear motor unit 300 can also be configured.

The shaft rotary type linear motor 300 in the third embodiment produces the same effect as the shaft rotary type linear motor 100 in the first embodiment. In particular, the shaft rotary type linear motor unit 300 is highly effective in applying a less expensive, compact (narrow) multi-axis actuator that can produce a large thrust, to a vertical shaft of a chip mounter head.

The preferred embodiments of the present invention have been described; it will be appreciated that they are examples for describing the present invention and the scope of the invention is not limited to these embodiments. Various other modifications and variations are possible without departing from the scope of the invention.

What is claimed is:
1. A shaft rotary type linear motor comprising:
  a hollow movable element having a shaft and an outer cylinder, a plurality of permanent magnets being arranged within the outer cylinder;
  an armature surrounding the hollow movable element, the armature having a plurality of coils;
  a frame containing the armature; and
  a rotatable and linearly movable linear guide supporting the shaft;
  wherein the outer cylinder contains and covers a first hollow end member, a magnet presser located on a tip side, a plurality of permanent magnets with spacers therebetween, a magnet presser located on a base end side, and a second hollow end member which are all arranged in this order,
  wherein each of the spacers and permanent magnets has an outer circumference in which a straight groove is formed, and each of the magnet pressers has a straight slit, and
  wherein airflow is created within the outer cylinder by respective hollow portions of the first and second hollow end members, the respective straight grooves of the spacers and the permanent magnets and the respective straight slits of the magnet pressers.

2. The shaft rotary type linear motor according to claim 1, wherein
the shaft is formed of a hollow ball spline shaft provided with a ball receiving groove,
the rotatable and linearly movable linear guide is formed by integrating a rotatable bearing with a ball spline bushing containing a ball,
the hollow ball spline shaft linearly moves while being supported by the ball spline bushing, and
the ball spline bushing rotates while being supported by the rotatable bearing.

3. The shaft rotary type linear motor according to claim 1, wherein
the shaft is formed of a hollow shaft, and
the rotatable and linearly movable linear guide is formed of a linear bushing or a sliding bearing.

4. The shaft rotary type linear motor according to claim 1, wherein
the shaft is a hollow shaft, and an air tube is connectable to a hollow portion of the shaft.

5. The shaft rotary type linear motor according to claim 1, wherein
the armature has a magnetic barrel provided with a straight opening, and the magnetic barrel contains the plurality of coils.

6. The shaft rotary type linear motor according to claim 5, wherein
the straight opening is formed on at least an upper portion of the magnetic barrel.

7. The shaft rotary type linear motor according to claim 5, wherein
each of the plurality of coils has a lead wire that is externally exposed from the magnetic barrel through a straight opening of the magnetic barrel.

8. The shaft rotary type linear motor according to claim 1, wherein
the frame has a main body formed in a rectangular frame shape, and the main body includes an upper frame, a lower frame, and both end frames located in a longitudinal direction of the main body.

9. The shaft rotary type linear motor according to claim 8, wherein
an upper frame of the main body in the frame has a long through-hole that defines a space through which lead wires are connected to the plurality of coils.

10. The shaft rotary type linear motor according to claim 8, wherein
the main body in the frame has an upper frame and a lower frame, one of which has an inlet and the other of which has an outlet, and
cooling air flows into the cooling passage via the inlet and flows out of the cooling passage via the outlet.

11. The shaft rotary type linear motor according to claim 8, wherein
a magnetic barrel is fixed with a filler to an inner surface of a main body in the frame.

12. The shaft rotary type linear motor according to claim 1, wherein
one or each of an upper frame and a lower frame of a main body in the frame has an inner surface in which a recess is formed.

13. The shaft rotary type linear motor according to claim 12, wherein
the respective recesses in the inner surfaces of the upper frame and the lower frame are positioned so as to be shifted from each other in a longitudinal direction of the upper and lower frames and to at least overlap each other.

14. The shaft rotary type linear motor according to claim 1, wherein
a linear encoder is provided in part of the frame.

15. A shaft rotary type linear motor unit comprising:
a plurality of shaft rotary type linear motors according to claim 1 arranged in a width direction of the shaft rotary type linear motors while abutting against one another; and
a plurality of sealing plates disposed on both end surfaces of the shaft rotary type linear motors which are located in the width direction,
wherein the sealing plates and the plurality of shaft rotary type linear motors are integrated with each other to form a multi-axis unit.

16. A shaft rotary type linear motor comprising:
a hollow movable element having a shaft and an outer cylinder, a plurality of permanent magnets being arranged within the outer cylinder;
an armature surrounding the hollow movable element, the armature having a plurality of coils;
a frame containing the armature;
a rotatable and linearly movable linear guide supporting the shaft;
wherein:
the armature has a magnetic barrel provided with a straight opening, and the magnetic barrel contains the plurality of coils; and
a cooling passage is formed by one or more of a gap between outer circumferences of coils and an inner surface of a magnetic barrel, a straight opening of the magnetic barrel, gaps between four corners of an outer surface of the magnetic barrel and an inner surface of a main body in the frame, and a gap between an outer surface of the magnetic barrel and a recess in an inner surface of the main body in the frame.

* * * * *